US005555492A

United States Patent [19]

Feger

[11] Patent Number: 5,555,492

[45] Date of Patent: Sep. 10, 1996

[54] SIGNAL LAMP

[75] Inventor: Rolf Feger, Bietigheim-Bissinger, Germany

[73] Assignee: ITT Automotive Europe GmbH, Frankfurt, Germany

[21] Appl. No.: 392,834

[22] PCT Filed: Aug. 19, 1993

[86] PCT No.: PCT/EP93/02220

§ 371 Date: Feb. 28, 1995

§ 102(e) Date: Feb. 28, 1995

[87] PCT Pub. No.: WO94/05949

PCT Pub. Date: Mar. 17, 1994

[30] Foreign Application Priority Data

Aug. 31, 1992 [DE] Germany .......................... 42 28 928.9

[51] Int. Cl.[6] .................................. F21Q 1/00; B60Q 1/26

[52] U.S. Cl. .......................... 362/293; 362/268; 362/309

[58] Field of Search .................................. 362/293, 339, 362/268, 331, 309, 290, 354

[56] References Cited

U.S. PATENT DOCUMENTS 4,656,567 4/1987 Morris .................................... 362/268

4,835,666 5/1989 Feger et al. ............................ 362/293

FOREIGN PATENT DOCUMENTS 0211742 1/1984 European Pat. Off. .

3326199 2/1987 Germany .

OTHER PUBLICATIONS

International Search Report for Application PCT/EP93/02220 filed 19 Aug. 1993.

*Primary Examiner*—Denise L. Gromada
*Assistant Examiner*—Sara Sachie Raab
*Attorney, Agent, or Firm*—Thomas N. Twomey; J. Gordon Lewis

[57] ABSTRACT

A casing and a closure plate of transparent, preferably, red color, and comprising one or several light filters provided between the light source and the closure plate, on the one hand, an intensive color impression of the closure plate is attained while the light source is turned off and, on the other hand, the light losses are reduced in that the closure plate is of a continuous coloring, the closure plate is subdivided into segments of varying plate thicknesses and the light filter is provided with recesses.

14 Claims, 1 Drawing Sheet

FIG 1
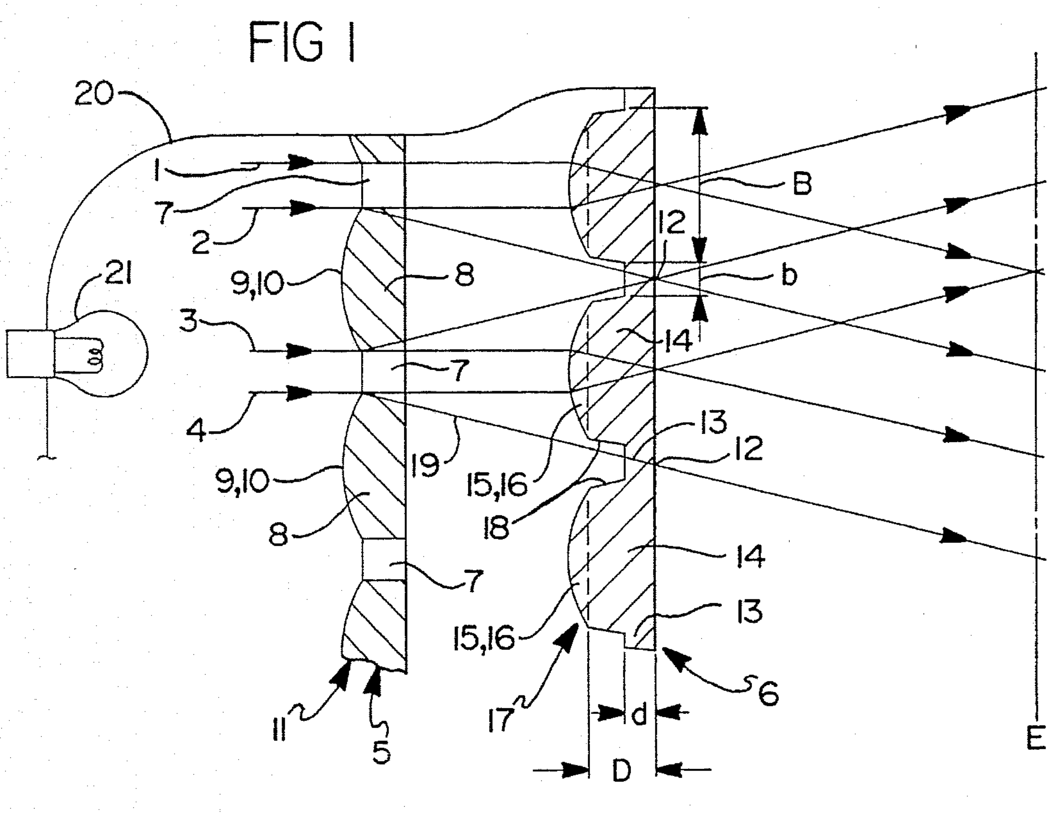
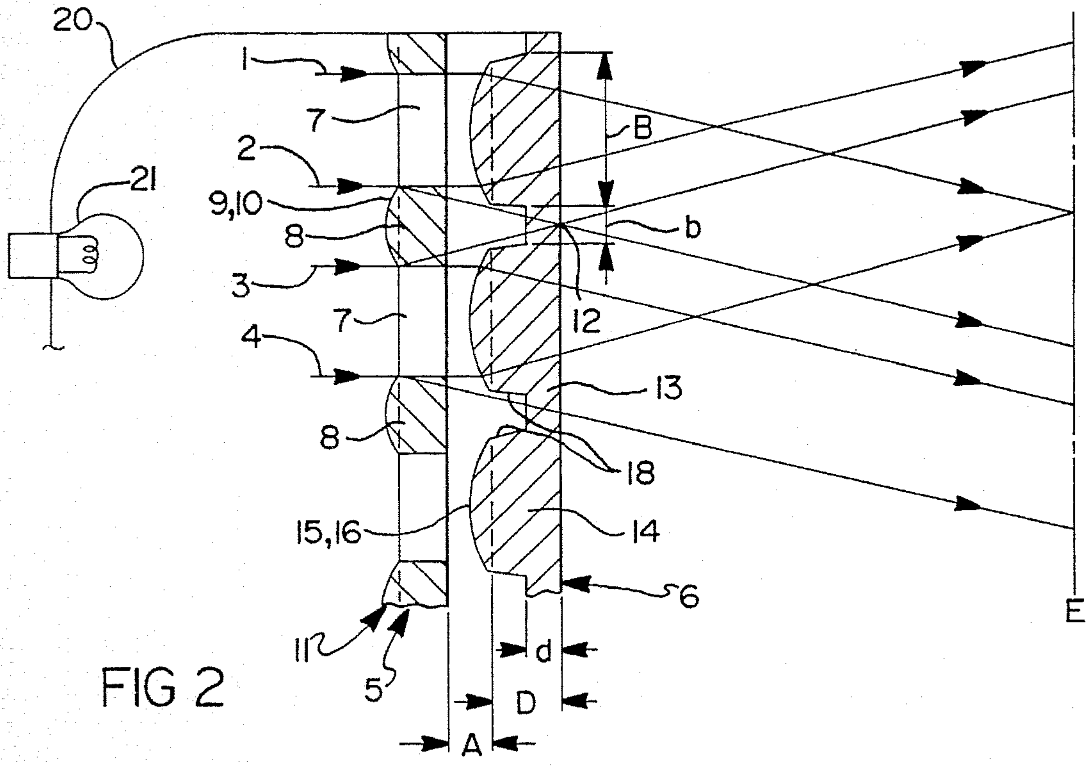
FIG 2

SIGNAL LAMP

TECHNICAL FIELD

The present invention relates to signal lamps, and in particular, signal lamps used with automotive vehicles.

BACKGROUND OF THE INVENTION

A signal lamp of the afore-mentioned type is disclosed by DE 33 26 199 A1. This prior art signal lamp as used with automotive vehicles is provided with a pink-colored closure plate and, in the interior thereof, includes another colored filter, it being possible to generate, by selecting a predetermined color for the said filter, a red, yellow or even white signal light. In order to cause the closure plate, in the turned-off condition of the light source of the signal lamp, to appear despite its pink color in bright red not or only negligibly affected by the color of the internal filter, red-colored strips are provided in the lamp between the inner filter and the closure plate. However, all of the prior known strip arrangements involve certain disadvantages. Either only a small quantity of the amount of light emitted by the light source or only part of the surface of the closure plate can be used for the generation of the signal. Moreover, some arrangements are only marginally suitable to minimize in the turned-off condition, the influence of the inner filter on the color of the closure plate. Finally, even large-scale technical efforts cannot entirely prevent an influence of the red-colored strips on the color of the signal light from occurring.

EP 0 211 742 A1 discloses a signal lamp foregoing the use of color-impermeable webs. In this prior art signal lamp the closure plate is provided, in strips, with a color filter imparting a certain color to the light rays passing through this area. Coupled ahead of the areas of the closure plate clear of filters, in a protruding plane, is a filter, thereby imparting a certain color also to the light rays passing through that area. At a certain distance from the closure plate, the whole light passing through the closure plate is of a homogenous color. In that signal lamp it is considered to be disadvantageous that the closure plate comprises alternately colored and transparent strips so that the outward appearance is not very attractive. Moreover, due to the plurality of series-arranged color filters the light yield is reduced, especially as regards the generation of white light; in this respect the red color of the colored closure plate has to be filtered out by a subtractive color mixture. Another disadvantage resides in that the closure plate can be designed only in a very light red or pink as a more intensive red would result in relatively high light losses.

It is, therefore, an object of the invention to provide a signal lamp which, in turned-off condition, conveys the impression of an intensive red, involving low light losses.

This problem, in the practice of the invention, is solved in that the closure plate has a continuous coloring, the closure plate is subdivided into segments of varying thicknesses and that the light filter is provided with a recess.

Due to the continuous coloring of the closure plate, the latter appears in a uniform, for example, red color which can be an intensive red. The subdivision of the closure plate into segments of varying thickness and the recesses provided in the light filter involve the advantage that the light emitted by the light source, in the areas in which the segments are of a high plate thickness, passes through the recesses of the light filter and is, therefore, not additionally attenuated by the light filter.

Provided in the areas of the segments of low plate thickness are the sections of the light filter located between the recesses where the light is colored. Although the color of the light weakens the intensity thereof, the light will only have to pass through the segments of the closure plate having a low plate thickness. In view of this design, the signal lamp, in the turned-off condition, has an intensive red coloring and, in the turned-on condition, a high light intensity as only the part of the light required to pass through the segments of a low plate thickness, must pass through an additional light filter.

According to another embodiment, the segments of varying plate thickness have different widths. It is especially the segments of a lower plate thickness that are narrower designed than the segments of a higher plate thickness, thereby imparting to the signal lamp a substantially uniform appearance as the segments of a lower plate thickness appearing slightly lighter are of a very low width so that the general impression is almost unaffected.

Preferably, at least one lens system is provided between the light filter and the closure plate. This lens system has the function to dissipate at least a part of the light passing through the closure plate causing the light to additively mix after passage through the closure plate.

According to another embodiment, the lens system is formed of lenses located on the segments of a high plate thickness, with the lenses and the segments being preferably integrally formed. This design involves the advantage that a separate component comprising the lens system can be eliminated as the lens system is provided directly on the rear and on the inner face, respectively, of the closure plate.

According to another embodiment, a lens system is provided between the light source and the light filter. Due to the lens system, a part of the light emitted by the light source is focused and emitted especially through the light filter and through the segments of the low thickness closure plate arranged therebehind. Due to the focusing of the light this focused light is pointedly led through the segment of the closure plate concerned.

The lens system, advantageously, is formed of the lenses provided on the light filter, with the lenses and the lens filter being preferably formed integrally, thereby eliminating the use of a separate component comprising the lens system. The lenses of the two lens systems can be of any desired design, i.e. they can either be of a concave and/or convex configuration. Moreover, the rear side and/or the front side of the light filter and/or of the closure plate can be in the form of a lens system.

According to another embodiment, the lens system comprises recesses in the area of the light filter recesses. According to this form of embodiment, lenses are provided only where a light filter for the light emitted by the light source is provided so that only the light passing through the light filter is deflected, with the lenses of the two lens systems being either in the form of cylindrical tangs, rotation-symmetrical lenses or of any other suitable configuration.

Preferably, the light of the light source is refracted either by the lens system associated to the light filter or by the light system associated to the closure plate which involves the advantage that a part of the light is not deflected by both lens systems but each lens system rather deflects a special area or share of the light emitted by the light source depending on the configuration of the respective lens system.

According to a preferred embodiment, the focal length of the lens system associated to the light filter is within the area of the segments of lower plate thickness, preferably, on the inner or outer face of the closure plate, thereby attaining the advantage that the light deflected by this lens system exclusively passes through the segments of lower plate so that the light intensity is only negligibly reduced.

According to another embodiment, it is provided that the focal length of the lens system associated to the closure plate is at a greater distance from the outer surface once the thickness difference within the segments of higher plate thickness is reduced, thereby making uniform the color intensity of the whole of the closure plate.

Preferably, the distance of the light filter from the inner face of the closure plate varies at varying signal colors, thereby enabling the share of the light passing through the segments of higher plate thickness and the segments of lower plate thickness, respectively, to be precisely controlled.

Advantageously, the desired signal color can be generated by color subtraction and a subsequent color addition. Due to the color subtraction, those parts of the color are generated which as a result of the color addition, subsequently, lead to the desired signal color. Due to the color addition the color intensity is enhanced.

FIG. 1 shows a first form of embodiment of the signal lamp according to the invention, intended, for example, for a white signal light.

FIG. 2 shows another form of embodiment of the signal lamp according to the invention, intended, for example, for a red signal light.

DETAILED DESCRIPTION OF THE PREFERRED EMBODIMENTS

In the example of embodiment as shown in FIG. 1, the light rays 1 to 4 emitted by a light source including casing 20, which are otherwise not shown which through suitable optical means are oriented in parallel, first strike a light filter 5 and, subsequently, a closure plate 6 from which they are discharged to the atmosphere. The remaining elements of the signal lamp (not shown) are of standard design. The light emerging from the signal lamp has a signal color which, normally, is either white, yellow and orange, respectively, or red.

The light filter 5 comprises recesses 7 in which the light is not subjected to any color change. The areas 8 located between the recesses 7 impart a different color to the light passing through the areas 8 in that they filter out a predetermined wave range. Moreover, the areas 8 are provided with a convex surface 9 forming the lenses 10. The combined lenses 10 form a lens system 11 which is associated to the light filter 5. Accordingly, the light passing through the areas 8 are so deflected as to converge toward the focal point 12 of the lenses 10. The light passing through the recesses 7 is not deflected, thereby maintaining its direction.

The closure plate 6 is subdivided into segments 13 and 14, with the segments 13 being less thick d than the segments 14. The segments 13 and 14 are alternately arranged. Moreover, the segments 14 on the side facing the light source are provided with a convex surface 15 thereby forming the lenses 16 of a lens system 17. Moreover, the segments 14 comprise oblique side walls 18, with the angle of inclination of the side wall 18 substantially corresponding to the angle of inclination of the confining ray 19 of the light bunch passing through the segment 13. Moreover, not only the thickness d of the segment 13 is less than the thickness D of the segment 14 but also the width b of the segment 13 is less than the width B of the segment 14.

Finally, one area 8 of the light filter 5 is placed at the level of a segment 13 so that the light passing through the said area 8 exclusively passes through the segment 13 of lower thickness d. The light passing through recess 7 then passes exclusively through the segment 14 located therebehind and is deflected therein.

In the example of embodiment as shown in FIG. 1 only a small part of the light emitted by the light source passes through the recesses 7, obtaining in the segments 14 a red color in view of the red coloring of the entire closure plate 5. The major part of the light emitted by the light source passes through the areas 8 and, hence, through a light filter and, subsequently, through the segments 13. The light filter 5 is so designed that after having passed through areas 8 and segments 13 a color is imparted to the light which through addition of the color of the light bunch leaving the segments 14 attains a neutral, i.e. white color. The light of white color, hence, is obtained by the addition of the color of the light of the segments 14 and of the color of the light of the segments 13. Because the segments 13 are of a thickness d lower than that of the segments 14, the reduction of the light intensity is relatively low. Moreover, the closure plate 6 in view of the lower width b of the segments 13 is uniform in terms of color, with an intensive red color impression prevailing on account of the intensive coloring of the closure plate 6.

In the example of embodiment as shown in FIG. 2 the distance A between the light filter 5 and the closure plate 6 is substantially smaller than in the example of embodiment according to FIG. 1 so that the areas 8 comprising the color filter 5 are also of a lower width. The recesses 7 are thus larger involving the advantage that the light portions passing through the recesses 7 are larger, thereby enabling more light to be passed through the segments 14. The light emerging from the segments 14 is intensive red. Consequently, the light filter 5 must be of a design such that the light formed by the confining rays 2 and 3 and passing through the areas 8 and moving past the segments 13 is intensive red. This is easily attained in that the light filter 5 is a red filter. If the light filter 5 is a yellow filter, a yellow color can be imparted to the light bunch confined by the confining rays 2 and 3 so that by adding the light to the light bunch passing through the segment 14, orange color is produced. The addition of these two colors is completed from level E when the mixture has reached a homogenous state.

One or more additional optical plates can be provided between the color filter 5 and the closure plate 6 for optimizing the homogeneous color impression.

We claim:

1. A signal lamp, in particular, for automotive vehicles, comprising:

a light source for emitting light rays, a casing including a closure plate of transparent coloring, and comprising one or more light filters provided between the light source and the closure plate, wherein the closure plate is subdivided into segments of varying plate thicknesses including a high plate thickness, and wherein the light filter is provided with recesses within a path of said light rays ahead of the segments having a high plate thickness.

2. A signal lamp according to claim 1, wherein the segments of varying plate thicknesses have different widths, with segments having low plate thicknesses being designed narrower than the segments of high plate thicknesses.

3. A signal lamp according to claim 2, wherein a first lens system is provided between the light filter and the closure plate.

4. A signal lamp according to claim 3, wherein the first lens system is formed of a plurality of lenses arranged on the segments of high plate thickness, with the lenses of the first lens system and the segments being formed integrally.

5. A signal lamp according to claim 4, wherein a second lens system is provided between the light source and the light filter.

6. A signal lamp according to claim 5, wherein the second lens system is formed of a plurality of lenses provided on the light filter, with the lenses of the second lens system and the light filter being formed integrally.

7. A signal lamp according to claim 5 wherein the second lens system comprises recesses in an area of the recesses of the light filter.

8. A signal lamp according to claim 3 wherein the first lens system is formed of at least one of a convex and concave lenses.

9. A signal lamp according to claim 3 wherein said light rays of the light source are refracted by at least one of the second lens system associated to the light filter and the first lens system.

10. A signal lamp according to claim 5 wherein the focal length of the second lens system associated to the light filter is within the area of the segments of low plate thickness.

11. A signal lamp according to claim 3 wherein the focus of the first lens system associated to the closure plate is in spaced relationship to an outer surface of the closure plate.

12. A signal lamp according to claim 11, wherein the distance of the light filter from an inner surface of the closure plate is different with varying signal colors.

13. A signal lamp according to claim 12, wherein a desired signal color is generated by a color subtraction and a subsequent color addition.

14. A signal lamp, in particular, for automotive vehicles, comprising:

a light source for emitting light rays, a casing including a closure plate of transparent coloring, and comprising one or more color light filters provided between the light source and the closure plate, wherein the closure plate is subdivided into segments of varying plate thicknesses, and wherein the light filter is provided with recesses that extend through the thickness of the light filter for passing said emitted light rays undeflected and without color change.

* * * * *